US012431012B2

(12) United States Patent
Wang et al.

(10) Patent No.: US 12,431,012 B2
(45) Date of Patent: Sep. 30, 2025

(54) METHOD AND SYSTEM FOR EXTRACTING OD LOCATIONS OF VEHICLE ON EXPRESSWAY

(71) Applicant: SOOCHOW UNIVERSITY, Suzhou (CN)

(72) Inventors: Xiang Wang, Suzhou (CN); Kexin Wang, Suzhou (CN); Xin Chu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 278 days.

(21) Appl. No.: 18/195,442

(22) Filed: May 10, 2023

(65) Prior Publication Data
US 2023/0274633 A1 Aug. 31, 2023

Related U.S. Application Data

(63) Continuation of application No. PCT/CN2022/076025, filed on Feb. 11, 2022.

(30) Foreign Application Priority Data

Dec. 29, 2021 (CN) .......................... 202111646253.2

(51) Int. Cl.
*H04W 4/029* (2018.01)
*G06V 20/62* (2022.01)
(Continued)

(52) U.S. Cl.
CPC ......... *G08G 1/0125* (2013.01); *G06V 20/625* (2022.01); *G08G 1/04* (2013.01); *H04W 4/029* (2018.02); *H04W 4/40* (2018.02)

(58) Field of Classification Search
CPC ....... G08G 1/0125; G08G 1/04; H04W 4/029; H04W 4/40; G06V 20/625
(Continued)

(56) References Cited

U.S. PATENT DOCUMENTS

2017/0366945 A1* 12/2017 Uliyar .................... G01S 19/51
2019/0182624 A1* 6/2019 Li .......................... H04W 4/027

FOREIGN PATENT DOCUMENTS

| CN | 106504528 A | 3/2017 |
| CN | 104050817 B | * 5/2017 |

(Continued)

OTHER PUBLICATIONS

Congming Shi, A quantitative discriminant method of elbow point for the optimal number of clusters in clustering algorithm, 2021, EURASIP Journal of Wireless Communications and Networking (Year: 2021).*

(Continued)

*Primary Examiner* — Matthias S Weisfeld
(74) *Attorney, Agent, or Firm* — SZDC Law PC

(57) ABSTRACT

The invention provides a method and system for extracting OD locations of a vehicle on an expressway. The method includes: acquiring mobile phone signaling data and license plate recognition data; preprocessing the signaling data and recognition data; segmenting mobile phone signaling data trajectories to obtain signaling data with a travel order; matching the mobile phone signaling data trajectories against license plate recognition data trajectories, to obtain a vehicle and a mobile phone signaling user corresponding to the vehicle; and extracting a passing time of the vehicle passing through a road section in the license plate recognition data, calculating time differences between the passing time and travel trajectory points of the mobile phone signaling user corresponding to the vehicle, and taking start and end locations of a travel order of mobile phone signaling data in which a minimum time difference is located as OD of a current travel of the vehicle.

8 Claims, 5 Drawing Sheets

(51) Int. Cl.
*G08G 1/01* (2006.01)
*G08G 1/04* (2006.01)
*H04W 4/40* (2018.01)

(58) Field of Classification Search
USPC .......................................................... 701/117
See application file for complete search history.

(56) References Cited

FOREIGN PATENT DOCUMENTS

| | | | | | |
|---|---|---|---|---|---|
| CN | 108717790 | A | * | 10/2018 | ............. G06K 9/344 |
| CN | 110505583 | A | * | 11/2019 | ............. H04W 4/02 |
| CN | 112530166 | A | | 3/2021 | |
| CN | 113256987 | A | | 8/2021 | |
| JP | 2019148456 | A | * | 9/2019 | |
| WO | WO-2021237812 | A1 | * | 12/2021 | ........... G06F 16/285 |

OTHER PUBLICATIONS

Khyati Mahendru, How to Determine the Optimal K for K-Means?, Jun. 17, 2019, Medium (Year: 2019).*

* cited by examiner

METHOD AND SYSTEM FOR EXTRACTING OD LOCATIONS OF VEHICLE ON EXPRESSWAY

This application is a Continuation Application of PCT/CN2022/076025, filed on Feb. 11, 2022, which claims priority to Chinese Patent Application No. 202111646253.2, filed on Dec. 29, 2021, which is incorporated by reference for all purposes as if fully set forth herein.

FIELD OF THE INVENTION

The present invention relates to the field of intelligent transportation technologies, and specifically to a method for extracting OD locations of a vehicle on an expressway.

DESCRIPTION OF THE RELATED ART

With the rapid development of the national economy and the acceleration of urbanization, the load of urban expressways is also becoming increasingly saturated, with congestion and even stoppages during peak hours. Intelligent traffic management is one of the means to effectively alleviate congestion on expressways, and traffic information is the prerequisite for intelligent traffic management.

Currently, scholars consider that the functionalization of urban transportation facilities can mitigate and alleviate the deteriorating traffic conditions and traffic congestion. Therefore, urban expressways that are mainly for transit traffic and can share large traffic volume and implement long-distance transportation have emerged. Urban expressways have the characteristics of one-way multi-lane, central divider, full three-dimensional intersection, ensuring continuous driving, and large capacity. Studies have shown that urban expressways carry a large amount of urban traffic and effectively improve urban traffic conditions. However, due to the rapid growth of traffic volume, the limitation of road network expansion, the blindness of traffic management, and the like, the load of urban expressways is becoming saturated, and even congestion and stoppage occurs during peak hours, which seriously affects the traffic quality of urban expressways. Therefore, it has become more and more urgent to improve the traffic efficiency of urban expressways and provide intelligent management means for the increasingly congested urban expressways by using a modern transportation system. With the continuous progress of traffic science and technology, traffic information acquisition and transmission equipment on road networks has become more and more complete and perfect, which provides the material basis for the study of traffic intelligence.

With the development of information age, more and more traffic data resources (such as mobile phone signaling data, license plate recognition data, smart card data, and vehicle GPS data) are available for the analysis of OD (origin and destination) information of a traveler. However, separate automatic license plate recognition data has problems such as a low coverage rate of automatic license plate recognition equipment, errors in license plate recognition, and failure to recognize some license plates.

SUMMARY OF THE INVENTION

An objective of the present invention is to provide a method and a system for extracting OD locations of a vehicle on an expressway, to remedy the problem of missing trip information in automatic license plate recognition data, and fix trip information for a vehicle on an expressway in combination with signaling data.

To resolve the foregoing technical problem, the present invention provides a method for extracting OD locations of a vehicle on an expressway, including the following steps:
  S1: acquiring mobile phone signaling data and license plate recognition data in a same area;
  S2: respectively preprocessing the mobile phone signaling data and the license plate recognition data, to obtain mobile phone signaling data trajectories and license plate recognition data trajectories after quality control;
  S3: segmenting the mobile phone signaling data trajectories to obtain mobile phone signaling data with a travel order;
  S4: matching the mobile phone signaling data trajectories against the license plate recognition data trajectories by using three-dimensional trajectory data, to obtain a vehicle and a mobile phone signaling user corresponding to the vehicle; and
  S5: extracting a passing time of the vehicle passing through a road section in the license plate recognition data, calculating time differences between the passing time and travel trajectory points of the mobile phone signaling user corresponding to the vehicle, and taking start and end locations of a travel order of mobile phone signaling data in which a minimum time difference is located as OD of a current travel of the vehicle.

As a further improvement to the present invention, the mobile phone signaling data includes a user ID, a base station sequence number, a base station entry time, a base station exit time, base station longitude data, and base station latitude data; and the license plate recognition data includes recognition device data and detection data, the recognition device data includes a video bayonet sequence number, video bayonet name, video bayonet longitude, and video bayonet latitude, and the detection data includes a license plate number and a passing time.

As a further improvement to the present invention, the preprocessing the mobile phone signaling data includes the following steps:
  deleting repetitive mobile phone signaling data;
  eliminating drift data in the mobile phone signaling data: if distances between a data point and two adjacent points in a trajectory of the mobile phone signaling user are both greater than the first threshold and a distance between a location of one of the adjacent points and a location of the other adjacent point is less than twice the first threshold, determining the data point as a drift data point, and eliminating the drift data point; and
  eliminating ping-pong data in the mobile phone signaling data: for a trajectory of the mobile phone signaling user, if in any adjacent time trajectory points, a speed between any adjacent trajectory points is greater than the second threshold, eliminating intermediate trajectory points, and keeping an initial point and an end point, to obtain actual mobile phone signaling data trajectories.

As a further improvement to the present invention, the preprocessing the license plate recognition data includes the following steps:
  for redundant repetitive license plate recognition data, only keeping a first piece of license plate recognition data;
  deleting license plate recognition data with a license plate number, a video bayonet sequence number or a passing time missing; and deleting abnormal license plate recognition data with a license plate number field not satisfying a license plate number arrangement rule.

As a further improvement to the present invention, the preprocessing the license plate recognition data further includes: matching a passing time field format of the license plate recognition data into a base station entry and exit time format of mobile phone signaling data in minutes, and converting longitude and latitude fields in the license plate recognition data into longitude and latitude of an AutoNavi coordinate system in the mobile phone signaling data.

As a further improvement to the present invention, the segmenting the mobile phone signaling data trajectories includes the following steps:

S31: arranging the mobile phone signaling data in ascending order with a user ID as a primary keyword and a base station entry time as a secondary keyword, and generating a travel chain of each signaling user on one day;

S32: for each signaling user, if a speed v between any two time-adjacent trajectory points in any k time-adjacent trajectory points is less than the third threshold and a time for which the signaling user has stayed at k time-adjacent trajectory points is greater than the fourth threshold, recognizing all the k time-adjacent trajectory points as stay points;

S33: with the stay points as trajectory segmentation points, labeling travel orders of any consecutive non-stay points as a same number starting from a first piece of mobile phone signaling data that is not recognized as a stay point, and labeling travel orders of any consecutive non-stay points following an encountered stay point as an incremented number of the previous number, to progressively arrange the mobile phone signaling data; and S34: deleting stay points in the mobile phone signaling data, and keeping data after a travel order is recognized through trajectory segmentation, where the calculation formula of the speed v between two time-adjacent trajectory points in step S32 is as follows:

$$v_{i+1} = \frac{d(\text{point}_i, \text{point}_{i+1})}{\text{point}_i^{in} \cdot t - \text{point}_{i+1}^{in} \cdot t}, \quad (1)$$

where d represents a distance function between two points, and $\text{point}_i^{in} \cdot t$ represents a base station entry time of the $\text{point}_i$.

As a further improvement to the present invention, before the matching the mobile phone signaling data trajectories against the license plate recognition data trajectories, a travel mode of the mobile phone signaling data is recognized, including the following steps:

determining an optimal clustering parameter K by using an elbow method, where a calculation formula is as follows:

$$SSE = \sum_{i=1}^{K} \sum_{p \in C_i} |p - m_i|^2, \quad (2)$$

where in the formula: K is the clustering parameter; $C_i$ is an $i^{th}$ cluster; p is a sample point $C_i$; and $m_i$ is a centroid of $C_i$; and after the data in the area is divided into travel orders and categorization is performed according to whether there is a record in a subway station, determining a cluster number respectively by using the elbow method, inputting the foregoing clustering indicators into a K-means++ algorithm to perform clustering, to obtain a clustering result of the K-means++ algorithm with no record in a subway station and a clustering result of the K-means++ algorithm with a record in a subway station, and recognizing travel modes of a non-motor vehicle travel and rail transport without transfer to another transport mode; and eliminating signaling users of travels that only include rail transport and have no transfer to another transport mode and non-motor vehicle travels, to reduce a calculation amount in a trajectory matching process.

As a further improvement to the present invention, the matching the mobile phone signaling data trajectories against the license plate recognition data trajectories specifically includes the following steps:

S41: searching all sequences of the mobile phone signaling data trajectories and the license plate recognition data trajectories for a longest common subsequences, and measuring a similarity degree between two trajectories by using trajectory expansion: determining whether a trajectory point in the mobile phone signaling data trajectories matches a trajectory point in the license plate recognition data through vertical matching of the fifth threshold by using an LCS algorithm, that is, calculating a Euclidean distance between the two trajectory points, and determining whether the distance is less than the fifth threshold;

S42: sorting the license plate recognition data according to the passing time, and performing the following steps on each trajectory point in a trajectory of the license plate recognition data from top to bottom:

S421: for a first trajectory point in license plate data, calculating difference values between a passing time of the trajectory point and a base station entry time of each trajectory point in the mobile phone signaling data, and if the difference value is less than a time threshold, labeling the part of trajectory points of the mobile phone signaling data as time matching trajectory points;

S422: for the time matching trajectory points, calculating Euclidean distances between these mobile phone signaling trajectory points and trajectory points in the license plate recognition data, and writing 1 in a matching quantity field following a mobile phone signaling user ID corresponding to a mobile phone signaling trajectory point with a distance between two points being less than the fifth threshold;

S423: for mobile phone signaling data in which no character string has been written in the matching quantity field, calculating any two adjacent trajectory points of the mobile phone signaling data, calculating a foot of a trajectory point on a line segment formed by the two points, if the foot is on the line segment, determining whether the foot satisfies the time threshold and the fifth threshold, and if yes, writing 1 in a matching quantity field following a mobile phone signaling user ID corresponding to the mobile phone signaling trajectory point;

S424: repeatedly performing steps S421 to S423 on each trajectory point in the license plate recognition data, and if there is already a quantity during writing in the matching quantity field, adding 1 to the quantity; and S425: after the foregoing steps have been completed on all trajectory points of license plate recognition data of one license plate, selecting a signaling user with the largest quantity in the matching quantity field of the mobile phone signaling data as the mobile phone signaling user corresponding to the vehicle.

As a further improvement to the present invention, reliability of a matching result is verified by using a path similarity degree, specifically including the following steps:

a similarity degree of an LCS is $S_{LCS}(P_{j,R}, P_{j',R'}) = D_{LCS}(P_{j,R}, P_{j',R'})/\min\{R, R'\}$, where $D_{LCS}(P_{j,R}, P_{j',R'})$ represents a length of a longest common subsequence between two trajectories, and $\min\{R, R'\}$ represents a length of a sequence with a short length between the trajectory $P_{j,R}$ and the trajectory $P_{j',R'}$, with a value ranging from 0 to 1; and according to a definition, when the value of $S_{LCS}(P_{j,R}, P_{j',R'})$ is closer to 1, it represents that the two trajectories are more similar.

A system for extracting OD locations of a vehicle on an expressway is provided, where OD locations of a vehicle are extracted by using the method for extracting OD locations of a vehicle on an expressway described above.

The beneficial effects of the present invention are as follows: In the present invention, missing trip information in automatic license plate recognition data is remedied by using mobile phone signaling data, and missing data of the automatic license plate recognition data for OD estimation is filled. A matching algorithm of video bayonet passage data and mobile phone signaling data is established, to provide a new method for the acquisition of OD information of urban expressways, so that the accuracy of acquiring related data can be improved, and more accurate and real-time traffic data is provided to provide the material basis for the study of traffic intelligence, thereby improving the traffic efficiency of urban expressways, mitigating and alleviating the deteriorating traffic conditions and traffic congestion, and providing better reference for the formulation of traffic demand management policies.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
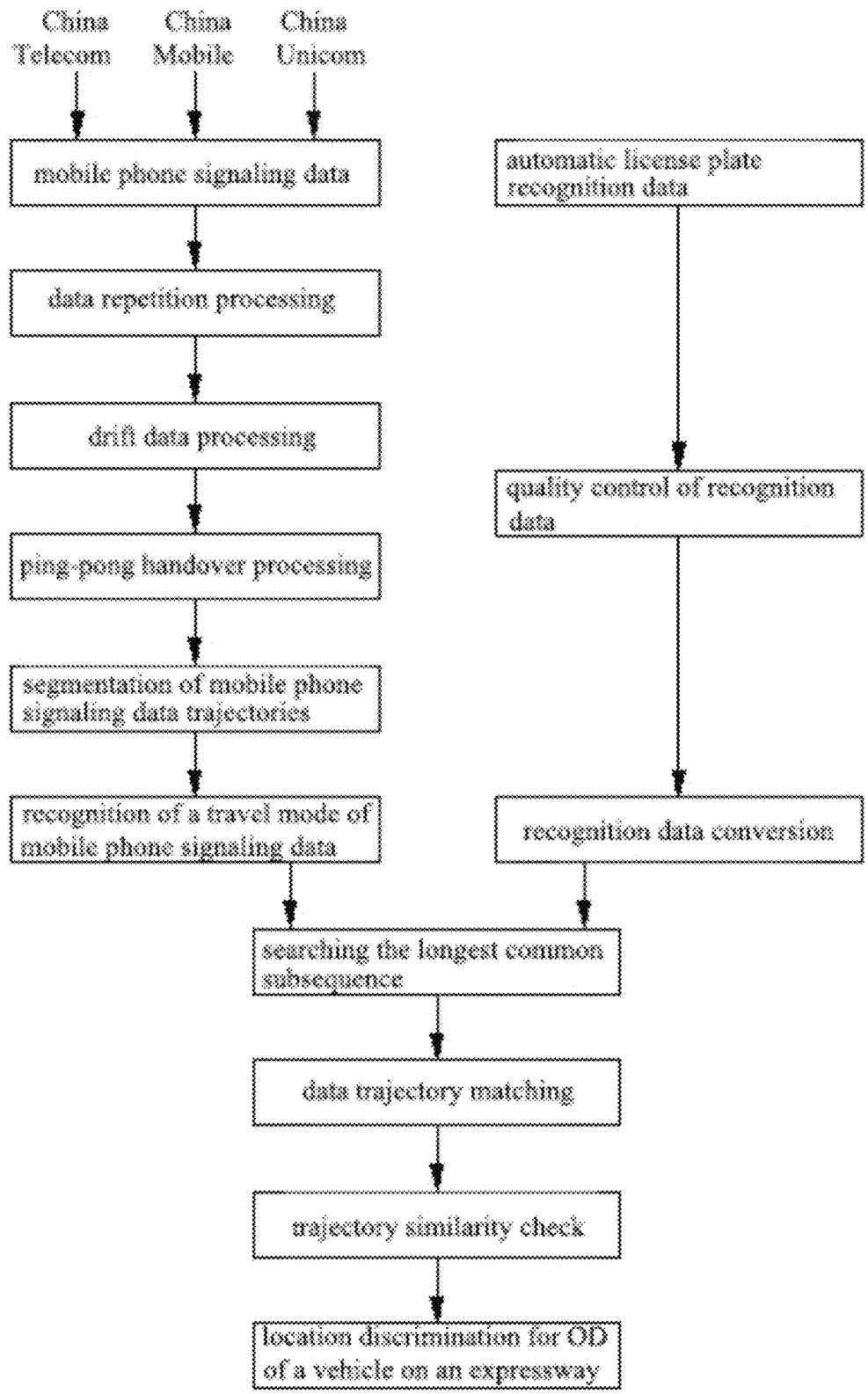
FIG. 1 is an overall schematic flowchart of a method according to the present invention.

Referring to FIG. 1, the present invention provides a method for extracting OD locations of a vehicle on an expressway. The method includes the following steps:

S1: acquiring mobile phone signaling data and license plate recognition data in a same area;

S2: respectively preprocessing the mobile phone signaling data and the license plate recognition data, to obtain mobile phone signaling data trajectories and license plate recognition data trajectories after quality control;

S3: segmenting the mobile phone signaling data trajectories to obtain mobile phone signaling data with a travel order;

S4: matching the mobile phone signaling data trajectories against the license plate recognition data trajectories by using three-dimensional trajectory data, to obtain a vehicle and a mobile phone signaling user corresponding to the vehicle; and S5: extracting a passing time of the vehicle passing through a road section in the license plate recognition data, calculating time differences between the passing time and travel trajectory points of the mobile phone signaling user corresponding to the vehicle, and taking start and end locations of a travel order of mobile phone signaling data in which a minimum time difference is located as OD of a current travel of the vehicle.

The mobile phone signaling data in the present invention is mobile phone signaling data from three carriers China Telecom, China Mobile, and China Unicom. The license plate recognition data is automatic license plate recognition data provided by traffic enforcement cameras and public security automatic license plate recognition devices in a studied area.

Specifically, mobile phone signaling data and license plate recognition data in a road section between roads of an expressway of a city on a day are used as an example to describe a specific implementation process of the present invention.

The format of the mobile phone signaling data of this city is shown in Table 1:

TABLE 1

| Field name | Field description | Exemplary description |
|---|---|---|
| id | id sequence number of a signaling user | 32050100********010001 |
| station | Sequence number of a mobile phone signaling base station | wt****h |
| in | Base station entry time | 985 |
| out | Base station exit time | 989 |
| c_lon | Longitude of a mobile phone signaling base station | 120.5**** |
| c_lat | Latitude of a mobile phone signaling base station | 31.3**** |

Mobile phone signaling data in this embodiment is mobile phone signaling data of mobile phone signaling base stations within 2 km of a starting point and mobile phone signaling base stations within 2 km of an end point of a road section between roads on a day. A data amount on a studied day is approximately 80 million pieces.

Automatic license plate recognition experimental data used in this embodiment is automatic license plate recognition data provided by existing traffic enforcement cameras and public security automatic license plate recognition devices in a city. There are approximately a total of 5000 automatic license plate recognition devices. An amount of license plate recognition data on a studied day is approximately 20 million pieces. A data format is shown in Table 2.

TABLE

| Field name | Field description | Exemplary description |
|---|---|---|
| kkbh | Sequence number of a license plate recognition video bayonet | 32050100********010001 |
| kkmc | Name of a license plate recognition video bayonet | North Ring Expressway-Tongjing Road |
| lon | Longitude of a license plate recognitionvideo bayonet | 120.5**** |
| lat | Latitude of a license plate recognition video bayonet | 31.3**** |

Data detected by the automatic license plate recognition devices includes a plurality of useless fields. To reduce an amount of operations, the experimental data in this embodiment is a license plate number, a passing time, an automatic license plate recognition device longitude field, and an automatic license plate recognition device latitude field. A data format of the automatic license plate recognition data is shown in Table 3.

TABLE 3

| Field name | Field description | Exemplary description |
|---|---|---|
| cph | License plate number | Hu A1***4 |
| kkbh | Sequence number of a license plate recognition video bayonet | 32050100********010001 |
| jgsj | Passing time | 2017-07-13 17:03:53 |

The data in this embodiment is automatic license plate recognition data of a road section between roads on a day. An amount of the data is 300 thousand pieces.

Preprocessing of mobile phone signaling data includes data repetition processing, drift data processing, and ping-pong handover processing:
1) For the problem of data repetition, a direct deletion manner is used to perform data preprocessing in this embodiment.
2) Drift data processing: For a given signaling user trajectory track, if for a point $point_i$, distances between the position of $point_{i+1}$ and the position of $point_i$ and $point_{i+2}$ are both greater than a given distance threshold $thr_1$, and a distance between the position of $point_{i+2}$ and the position of $point_i$ is less than $2 \times thr_1$. In this case, $point_{i+1}$ in the middle is considered as a "drift" point. Such points are eliminated.

Figure 2:
FIG. 2 is a schematic diagram of ping-pong handover processing according to an embodiment of the present invention.

The threshold $thr_1$ reflects a construction distance of a base station, to determine a data drift phenomenon. Generally, mobile phone signaling base stations are distributed within 500 m in a densely populated area, and generally approximately ranges from 1 km to 2 km in other urban areas. The value of the threshold $thr_1$ in this embodiment is 2 km.
3) Ping-pong handover data processing: For a given mobile phone signaling user trajectory track, in any adjacent k time-adjacent trajectory points $point_{i+1}$, $point_{i+2}$, . . . , and $point_{i+k}$, a speed between any two adjacent trajectory points in the k adjacent points is calculated. If the value of the speed is greater than the threshold $thr_2$, an $(i+2)^{th}$ trajectory point to an $(i+k-1)^{th}$ trajectory point are eliminated. Only $point_{i+1}$ and $point_{i+k}$ are kept. The Ping-pong handover processing is shown in FIG. 2.

The threshold $thr_2$ reflects a speed during a travel. The ping-pong handover phenomenon usually occurs when the speed is low. A studied road in this embodiment has a speed limit of 80 km/h. Therefore, the threshold in this embodiment is 80 km/h.

Figure 3:
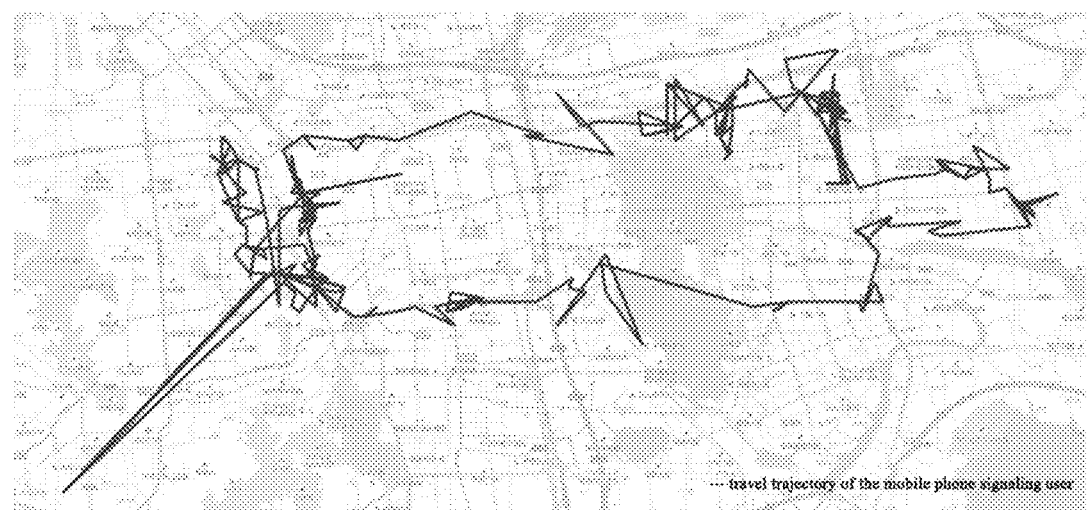
FIG. 3 is a diagram of a travel trajectory of original mobile phone signaling data of a user 5** according to an embodiment of the present invention.

Mobile phone signaling data of a mobile phone signaling user with an id of 5** on a day is selected for random sampling in this embodiment. A travel trajectory of original mobile phone signaling of the user is shown in FIG. 3.

Figure 4:
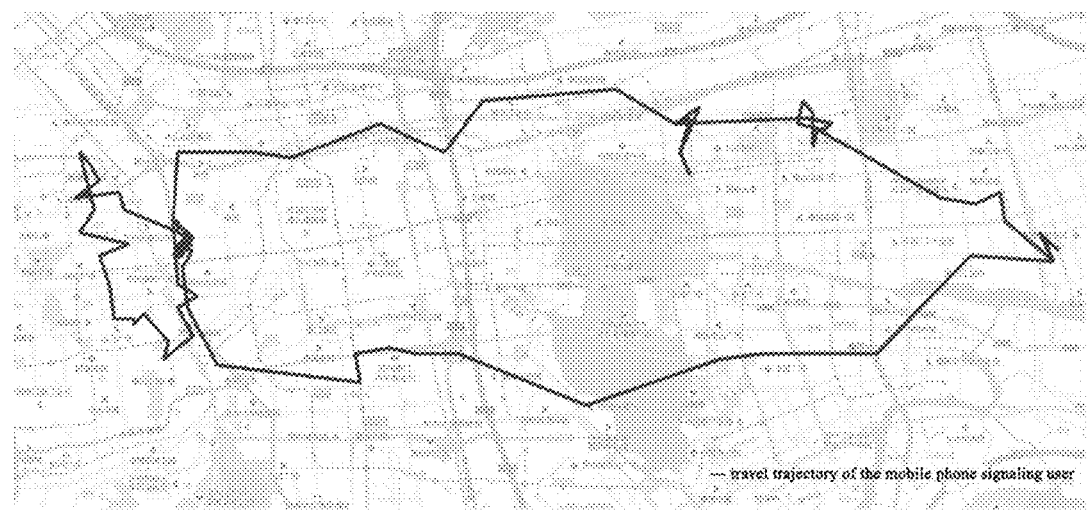
FIG. 4 is a diagram of a travel trajectory of mobile phone signaling data after quality control of the user 5** according to an embodiment of the present invention.

After deduplication, elimination of drift data, and elimination of ping-pong data are performed on the mobile phone signaling data of the user, a travel trajectory of mobile phone signaling after data preprocessing is shown in FIG. 4.

License Plate Recognition Data Preprocessing:

Due to the quality of automatic license plate recognition devices, automatic license plate recognition data has problems such as a vehicle loss, a license plate miss, and a license plate inaccuracy. The license plate misalignment inaccuracy includes an impossible Chinese character or symbol in a recognized license plate and a misdetermination of similar elements in a recognized license plate. For the problems that a vehicle is lost and there is an impossible Chinese character or symbol in a license plate, the problematic data cannot be processed relying on the automatic license plate recognition data. In this embodiment, cases of a failure to recognize a license plate and an abnormal character in a recognized license plate are preprocessed.
1) For redundant repetitive data, only the first piece is kept.
2) Automatic license plate recognition data with an important field (a license plate number, a video bayonet sequence number or a passing time) missing is deleted.
3) An abnormal character in a recognized license plate is deleted. That is, abnormal data with a license plate number field not satisfying a license plate number arrangement rule.

Automatic License Plate Recognition Data Conversion:

A passing time field format of the license plate recognition data is matched into a base station entry and exit time format of mobile phone signaling data in minutes.

In addition, a longitude and latitude coordinate system of the automatic license plate recognition data is a wgs84 coordinate system. A longitude and latitude coordinate system of the mobile phone signaling data is an AutoNavi coordinate system. To avoid a deviation due to different coordinate systems, longitude and latitude fields in the automatic license plate recognition data are converted into longitude and latitude of the AutoNavi coordinate system.

A pseudocode for performing data conversion on the passing time and the longitude and latitude fields of the automatic license plate recognition data is shown in Table 4.

TABLE 4

Input: a preprocessed automatic license plate recognition data set
Output: an automatic license plate recognition data set after format conversion of the passing time and the longitude and latitude fields
For every $x_i$ (for all data objects)
  A quantity of hours × 60 + a quantity of minutes in a passing time field of license plate recognition data, to obtain $t_i$
  Return $t_i$ to the passing time field of the license plate recognition data for replacement
End for
  For every $x_i$ (for all data objects after the passing time field has been updated)
  Convert a longitude field of the wgs84 coordinate system into AutoNavi coordinate system longitude $lon_i$
  Return $lon_i$ to the latitude field of the license plate recognition data for replacement TABLE 4-continued Convert a longitude field of the wgs84 coordinate system into AutoNavi coordinate system latitude $lat_i$
 Return $lat_i$ to the latitude field of the license plate recognition data for replacement
End for
Output: the automatic license plate recognition data after format conversion of the passing time and the longitude and latitude fields.

Segmentation of Mobile Phone Signaling Data Trajectories:
 Step 1: arranging the mobile phone signaling experimental data in this embodiment in ascending order with a user ID as a primary keyword and a base station entry time as a secondary keyword, and generating a travel chain of each signaling user on one day;
 Step 2: for each different signaling user, if a speed v between any two time-adjacent trajectory points in any k time-adjacent trajectory points is less than the threshold $thr_3$ and a time for which the user has stayed at k time-adjacent trajectory points is greater than the threshold $thr_4$, recognizing all the k time-adjacent trajectory points as stay points;
 Step 3: for each different signaling user, with the stay points recognized in step 2 as trajectory segmentation points, labeling travel orders of any consecutive non-stay points as a "1" starting from a first piece of mobile phone signaling data that is not recognized as a stay point, and labeling travel orders of any consecutive non-stay points following an encountered stay point as "2", where the rest is deduced by analogy; and
 Step 4: deleting stay points in the mobile phone signaling data, and only keeping data after a travel order is recognized for subsequent OD extraction.

The calculation formula of the speed v between two time-adjacent trajectory points in step 2 is as follows:

$$v_{i+1} = \frac{d(\text{point}_i, \text{point}_{i+1})}{\text{point}_i^{in} \cdot t - \text{point}_{i+1}^{in} \cdot t}, \quad (2)$$

where $d(\text{point}_i, \text{point}_{i+1})$ represents a distance function between two points, and $\text{point}_i^{in} \cdot t$ represents a base station entry time of the $\text{point}_i$.

In this embodiment, a base station position is used in place of an actual position of a signaling user, and the time precision of mobile phone signaling data is minute. Therefore, to determine whether a user signaling trajectory point is a stay point, the threshold $thr_3$ is set to 5 km/h. The threshold $thr_4$ reflects a stay time of a signaling user. A cycle of data exchange between a base station and a terminal is usually 30 min, and 30 min better satisfies a range of an actual stay time of the user. Therefore, the threshold $thr_4$ in the present invention is set to 30 min.

A travel order division table of the signaling user is obtained after trajectory segmentation. The same field "travel order" indicates the same travel, as shown in Table 5.

TABLE 5

| Signaling id | station | in | out | c_lon | c_lat | Travel order |
|---|---|---|---|---|---|---|
| 3* | wt*g9 | 719 | 727 | 120.**11 | 31.**75 | 1 |
| 3* | wt*7k | 727 | 762 | 120.**58 | 31.**56 | 1 |
| 3* | wt9 | 762 | 767 | 120.79 | 31.**16 | 1 |
| 3* | wtx | 876 | 877 | 120.32 | 31.**09 | 2 |

TABLE 5-continued

| Signaling id | station | in | out | c_lon | c_lat | Travel order |
|---|---|---|---|---|---|---|
| 3* | wtt | 877 | 880 | 120.86 | 31.**09 | 2 |
| 3* | wtj | 880 | 881 | 120.86 | 31.**62 | 2 |
| 3* | wt9 | 881 | 888 | 120.79 | 31.**16 | 2 |

Recognition of a Travel Mode of Mobile Phone Signaling Data:

In the present invention, motor vehicle travels, rail transport travels, and non-motor vehicle travels are distinguished through clustering, and signaling users of travels that only include rail transport and non-motor vehicle travels are eliminated, to reduce a calculation amount in a trajectory matching process.

An optimal clustering parameter K is determined by using an elbow method, where a calculation formula is as follows:

$$SSE = \sum_{i=1}^{K} \sum_{p \in C_i} |p - m_i|^2 \quad (2)$$

where in the formula:
K—a clustering parameter;
$C_i$—an $i^{th}$ cluster;
p—a sampling point in $C_i$; and
$m_i$—a centroid (center point) of $C_i$.

After the data in the studied area is divided into travel orders and categorization is performed according to whether there is a record in a subway station, a cluster number is determined respectively by using the elbow method, inputting the foregoing clustering indicators into a K-means++ algorithm to perform clustering, to obtain a clustering result of the K-means++ algorithm with no record in a subway station and a clustering result of the K-means++ algorithm with a record in a subway station, which are respectively shown in Table 6 and Table 7.

TABLE 6

Clustering result of the K-means++ algorithm with no record in a subway station:

| Cluster sequence number | Theoretical distance km | Accumulated distance km | Travel duration | Average sped km/h | Path complexity |
|---|---|---|---|---|---|
| 1 | 8.74 | 64.04 | 275.80 | 15.15 | 25.97 |
| 2 | 47.11 | 68.26 | 128.41 | 39.19 | 1.49 |
| 3 | 15.49 | 27.29 | 68.53 | 28.56 | 2.08 |
| 4 | 2.27 | 6.66 | 33.64 | 14.89 | 5.38 |

TABLE 7

Clustering result of the K-means++ algorithm with a record in a subway station:

| Clustering indicator | Cluster sequence number: 5 | Cluster sequence number: 6 |
|---|---|---|
| Theoretical distance km | 12.29 | 12.20 |
| Accumulated distance km | 32.36 | 41.40 |
| Travel duration min | 110.68 | 134.30 |
| Average speed km/h | 19.16 | 19.15 |
| Path complexity | 8.21 | 12.15 |
| Subway travel duration min | 5.80 | 19.54 |

TABLE 7-continued

Clustering result of the K-means++ algorithm with a record in a subway station:

| Clustering indicator | Cluster sequence number: 5 | Cluster sequence number: 6 |
|---|---|---|
| Subway travel distance km | 1.86 | 5.24 |
| Total proportion of a subway travel duration | 8.18% | 37.36% |
| Total proportion of a subway travel distance | 7.33% | 36.77% |

As can be seen, a non-motor vehicle has a short travel distance, a short travel duration, and a low average sped, and purposeless travels such as a walk usually have a higher path complexity. Therefore, in the present invention, a travel mode with a cluster sequence number of 4 in Table 6 is recognized as a non-motor vehicle travel. Considering that people may transfer to another transport mode during rail transport travels, travels with a record in a subway station are clustered to obtain a cluster 5 and a cluster 6 of travel modes. In the travel mode with a cluster sequence number of 6, the subway travel duration and distance are both long, and are recognized as rail transport without transfer to another transport mode in the present invention.

Signaling users of travels that only include rail transport and have no transfer to another transport mode and non-motor vehicle travels are eliminated, to reduce a calculation amount in a trajectory matching process.

A trajectory matching algorithm includes trajectory matching of mobile phone signaling data and automatic license plate recognition data and trajectory similarity check:

1) A longest common subsequence is used for searching all sequences for the longest subsequence, and a similarity degree of two trajectories is measured through trajectory expansion. It is assumed that $P_{j,R}$ and $P_{j',R'}$ are respectively a $j^{th}$ trajectory of the mobile phone signaling data and a $j'^{th}$ trajectory of the automatic license plate recognition data. $p_{j,r}$ represents an $r^{th}$ data point in the trajectory $P_{j,R}$, and $p_{j',r'}$ represents an $r'^{th}$ data point in the trajectory $P_{j',R'}$. An LCS uses a vertical matching threshold $thr_5$ to determine whether two points match, that is, calculates a Euclidean distance between $p_{j,r}$ and $p_{j',r'}$ and determines whether the distance is less than the threshold $thr_5$. The threshold $thr_5$ is similar to the threshold $thr_1$ and reflects a construction distance of a base station. The value of the threshold $thr_5$ in the present invention is 2 km.

2) Trajectory matching algorithm includes trajectory matching of mobile phone signaling data and automatic license plate recognition data: Trajectory matching algorithm includes trajectory matching of mobile phone signaling data and automatic license plate recognition data is performed by using three-dimensional trajectory data (longitude, latitude, and a passing time). After a time dimension is added, during the matching and determination of two trajectory points, a time threshold $thr_6$ needs to be added. All travel data sets of a license plate within one day are randomly selected from automatic license plate recognition data after filtering. The following operations are performed on each trajectory point in a trajectory from top to bottom in a time order:

Step 1: for a first trajectory point $p_{j',1}$ in automatic license plate data, calculating difference values between a passing time of the trajectory point and a base station entry time of each trajectory point in the mobile phone signaling data, and if the difference value is less than the threshold $thr_6$, labeling the part of trajectory points of the mobile phone signaling data as "time matching trajectory points";

Step 2: for the "time matching trajectory points" labeled in Step 1, calculating Euclidean distances between these mobile phone signaling trajectory points and trajectory points $p_{j',1}$ in the automatic license plate recognition data, and writing "1" in a matching quantity field following a mobile phone signaling user id corresponding to a mobile phone signaling trajectory point with a distance between two points being less than the threshold $thr_5$;

Step 3: for mobile phone signaling data in which no character string has been written in the "matching quantity" field, calculating any two adjacent trajectory points of the mobile phone signaling data, calculating a foot of a trajectory point $p_{j',1}$ on a line segment formed by the two points, if the foot is on the line segment, determining whether the foot satisfies the thresholds $thr_5$ and $thr_6$, and if yes, writing "1" in a "matching quantity" field following a mobile phone signaling user id corresponding to the mobile phone signaling trajectory point;

Step 4: repeatedly performing the foregoing steps on each trajectory point in the automatic license plate data, and if there is already a quantity during writing in the matching quantity field, adding 1 to the quantity; and Step 5: after the foregoing steps have been completed on all trajectory points of automatic license plate recognition data of one license plate, selecting a signaling user with the largest quantity in the "matching quantity" field of mobile phone signaling data as the mobile phone signaling user corresponding to the license plate.

A pseudocode for performing trajectory matching on mobile phone signaling data and automatic license plate recognition data is shown in Table 8:

TABLE 8

Input: a filtered automatic license plate recognition data set and mobile phone signaling data set
Output: a mobile phone signaling user ID correspondingly matching a license plate in the automatic license plate recognition data set
Add a "matching quantity" field to mobile phone signaling data, and assign 0 to the field
For every $x_i$ (for every license plate recognition data trajectory point of the same license plate)
    For every $y_i$ (for every mobile phone signaling data trajectory point)
        A time difference $t_i$ = |a passing time of $x_i$ − a base station entry time of $y_i$|
        Return the time difference $t_i$ to a time difference field of the mobile phone signaling data)
    End for
    For every $y_i$ (for every mobile phone signaling data trajectory point after the time difference field is updated)
        If $t_i$ is less than a time threshold of 5 min
            Calculate a Euclidean distance $d_i$ between $y_i$ and $x_i$
            If $d_i$ is less than a distance threshold of 2 km
                Add 1 to a "matching quantity" field of the signaling user ID corresponding to $y_i$
        Else
            Pass
    End for
    For every $z_i$ (for every piece of mobile phone signaling data with a "matching quantity" field of 0)
        Calculate a foot of $x_i$ on a line segment formed by $z_i$ and $z_{i+1}$
        If the foot is on the line segment
            Calculate an absolute value $t_f$ of a time difference between $x_i$ and the foot and a distance $d_f$ TABLE 8-continued

```
If t_f < 5 min and d_f < 2 km
        Add 1 to a "matching quantity" field of the signaling
user ID corresponding to z_i
        Else
            Pass
        Else
            Pass
    End for
End for
Output a signaling user ID corresponding to a maximum value of
"matching quantity" of the mobile phone signaling data
```

3) Trajectory similarity check: reliability of a matching result is verified by using a path similarity degree:
   a similarity degree of an LCS is $S_{LCS}(P_{j,R}, P_{j',R'})=D_{LCS}(P_{j,R}, P_{j',R'})/\min\{R, R'\}$, where $D_{LCS}(P_{j,R}, P_{j',R'})$ represents a length of a longest common subsequence between two trajectories, and min{R, R'} represents a length of a sequence with a short length between the trajectory $P_{j,R}$ and the trajectory $P_{j',R'}$, with a value ranging from 0 to 1; and according to a definition, when the value of $S_{LCS}(P_{j,R}, P_{j',R'})$ is closer to 1, it represents that the two trajectories are more similar.

Figure 5:
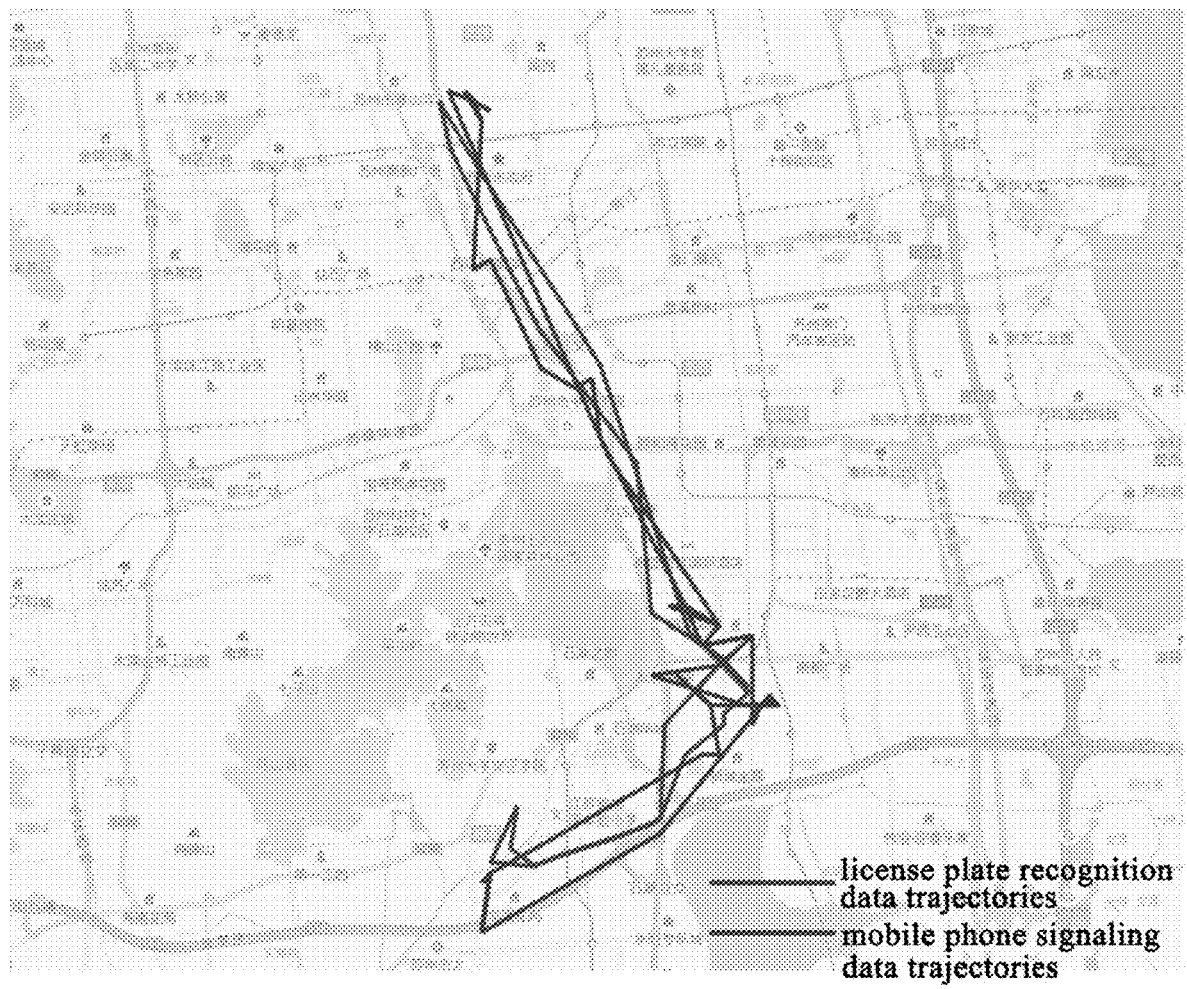
FIG. 5 shows a trajectory matching result of *E2***6 according to an embodiment of the present invention.

A travel trajectory of automatic license plate recognition data of a license plate "*E2*6" on one day is randomly extracted, and is matched in mobile phone signaling data according to the foregoing matching steps, to obtain through matching that a mobile phone signaling user ID corresponding to the travel trajectory is 7*9. A trajectory matching result is shown in FIG. 5.

A longest common subsequence of the trajectory of the license plate and a signaling trajectory has a length of 39. A trajectory with a shorter length of the two trajectories has a length of 48, and $S_{LCS}$=81.25% is obtained through calculation.

Travel trajectories of 230 vehicles are randomly sampled from the filtered automatic license plate recognition data set, and are matched in the mobile phone signaling data by using the matching step in 5.2, to obtain trajectory matching results and trajectory similarities. A similarity average value of 230 license plate recognition trajectories is 77.7%, and part of the results are shown in Table 9.

TABLE 9

License plate recognition result

| License plate number | Signaling ID | Length of longest common subsequence | License plate recognition trajectory length | Mobile phone signaling trajectory length | Similarity $S_{LCS}$ |
|---|---|---|---|---|---|
| *EX*6 | 13*5 | 128 | 137 | 274 | 93.43% |
| *E2*W | 13*7 | 23 | 24 | 42 | 95.83% |
| *E3*1 | 12*1 | 26 | 27 | 91 | 96.30% |
| *EB*8 | 22*7 | 18 | 21 | 494 | 85.71% |
| *EZ*5 | 16*3 | 34 | 48 | 109 | 70.83% |
| Hu C7*4 | 15*5 | 5 | 6 | 60 | 83.33% |
| *FP*4 | 35 | 17 | 24 | 66 | 70.83% |
| *C1*3 | 15*9 | 16 | 21 | 43 | 76.19% |
| *DY*5 | 15*4 | 37 | 46 | 94 | 80.43% |
| *YH*4 | 4*3 | 17 | 19 | 25 | 89.47% |

It can be seen from the randomly sampled trajectory matching results (part) of 230 vehicles that an average value of trajectory similarities of the trajectory matching algorithm established in the present invention is close to 80%. It is verified that trajectory matching of mobile phone signaling data and automatic license plate recognition data using three-dimensional trajectory data (longitude, latitude, and a passing time) in the algorithm has a good matching effect.

Method for Extracting GD of a Vehicle on an Expressway

First, a passing time of the vehicle passing through a road section in the license plate recognition data is extracted, then time differences between the passing time and travel trajectory points of the signaling of signaling user correspondingly matching the vehicle are calculated, and start and end locations of a travel order of mobile phone signaling data in which a minimum time difference is located as travel GD of a current travel of the vehicle.

A pseudocode for an GD extraction method is shown in Table 10:

TABLE 10

```
Input: license plate recognition data of a sample vehicle and mobile phone
signaling data of a matching sample vehicle
Output: OD points of a single travel of a sample vehicle
For every x_i (for all license plate recognition data)
    If a device sequence number of x_i is a sequence number of a ramp license
plate recognition device on a ** road:
        For every y_i (for all mobile phone signaling data matching the license
plate)
            Calculate an absolute value t_{x_i,y_i} of a difference value between a
base station entry time of y_i and a passing time of x_i
        End for
        Find a minimum value min (t_{x_i,y_i}) of t_{x_i,y_i}, and output a travel order
corresponding to the minimum value in signaling data
            OD points of a single travel corresponding to the license plate are
base station positions of the first and last mobile phone signaling
corresponding to the travel order in the signaling data
    Else
        Pass
End for
```

Figure 6:
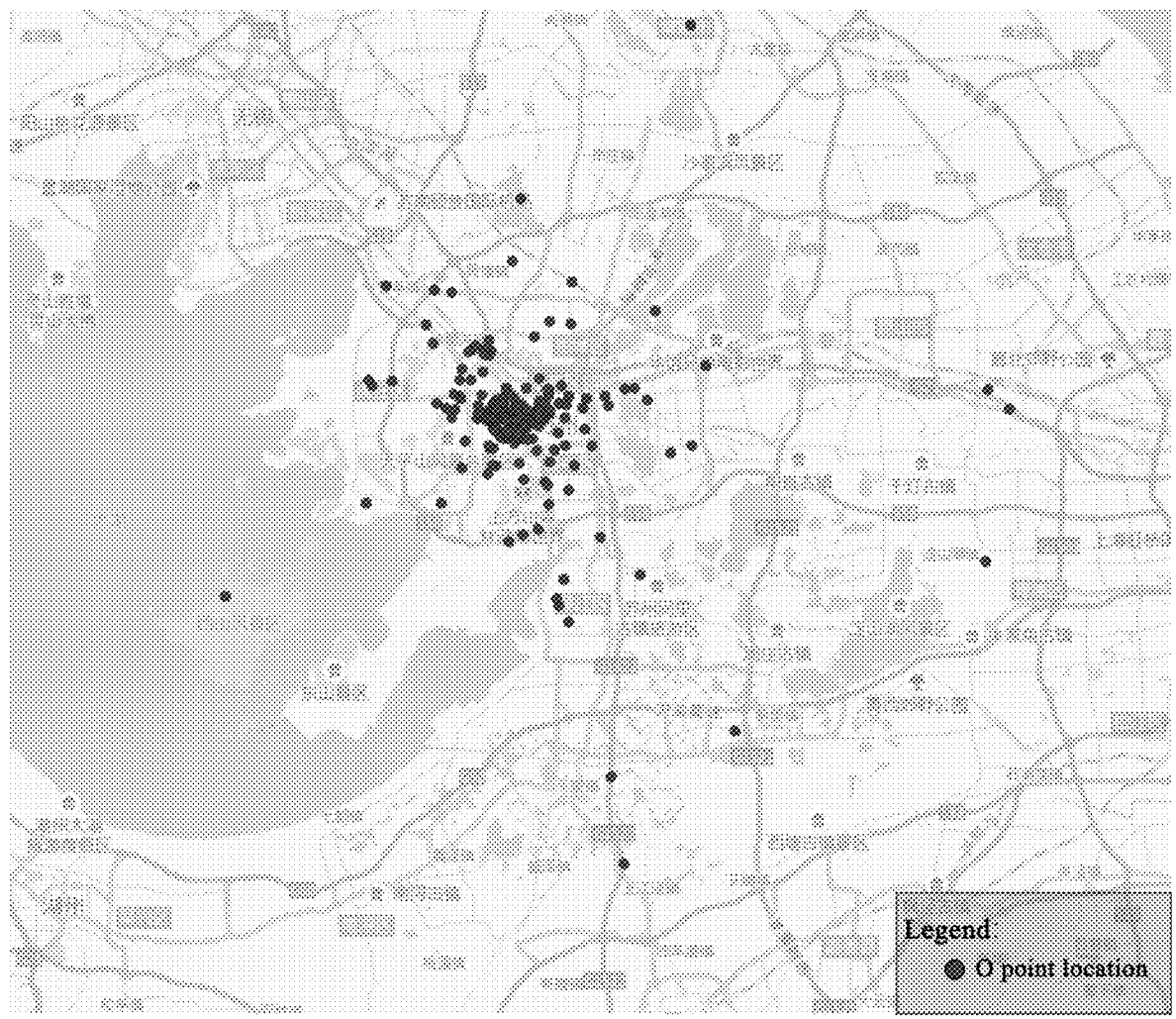
FIG. 6 is a distribution map of O points of a sample vehicle according to an embodiment of the present invention.
Figure 7:
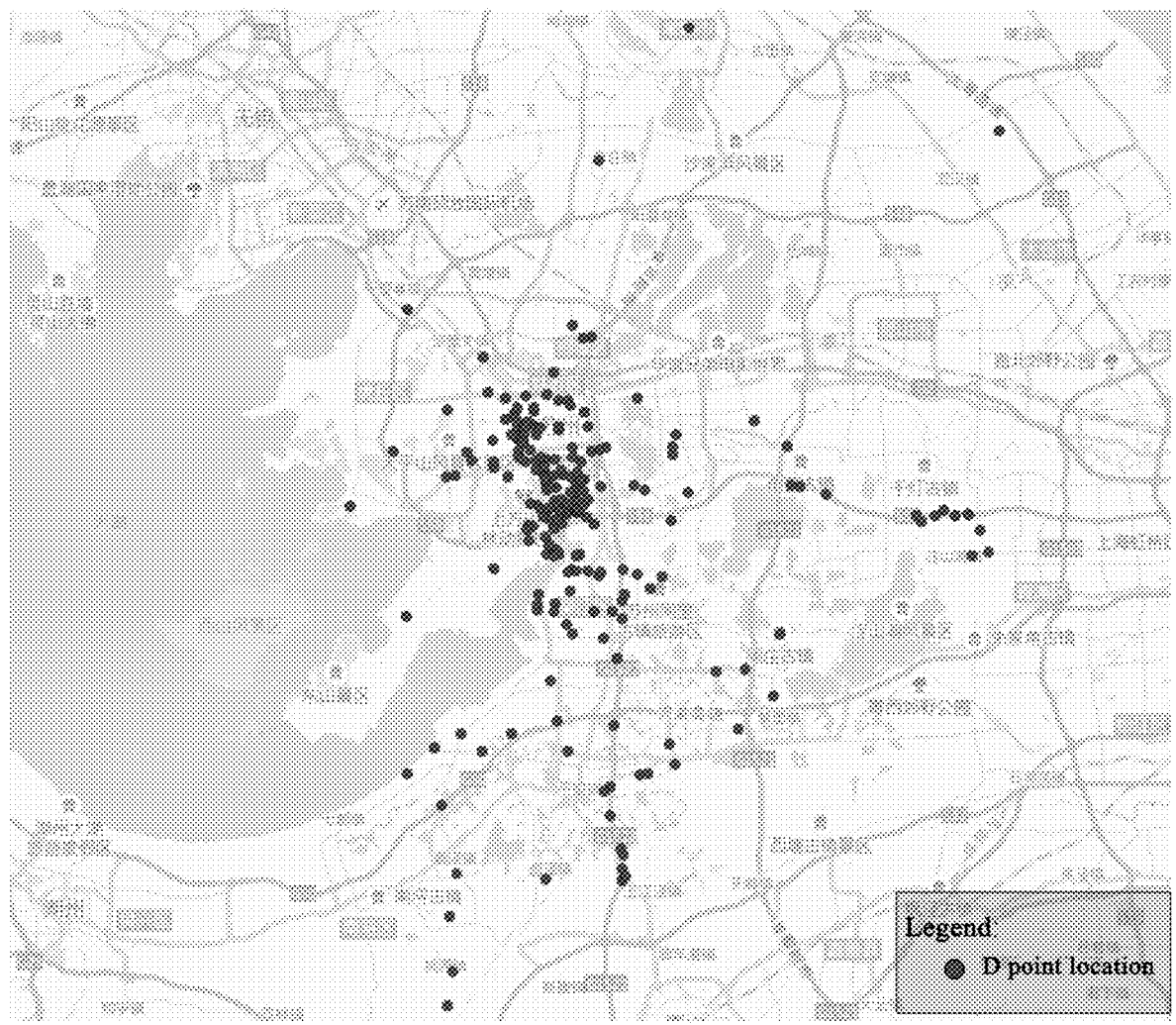
FIG. 7 is a distribution map of D points of a sample vehicle according to an embodiment of the present invention.

Results of performing O point extraction on the 230 vehicles by using the foregoing extraction method are shown in FIG. 6, and results of performing D point extraction are shown in FIG. 7.

The present invention further provides a system for extracting OD locations of a vehicle on an expressway, where OD locations of a vehicle are extracted by using the method for extracting OD locations of a vehicle on an expressway described above.

It needs to be noted that the present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A method for extracting origin and destination (OD) locations of a vehicle on an expressway, comprising steps of:
   S1: acquiring mobile phone signaling data and license plate recognition data in a same area;
   S2: respectively preprocessing the mobile phone signaling data and the license plate recognition data, to obtain mobile phone signaling data trajectories and license plate recognition data trajectories after quality control;
   S3: segmenting the mobile phone signaling data trajectories to obtain mobile phone signaling data with a travel order;
   S4: matching the mobile phone signaling data trajectories against the license plate recognition data trajectories by using three-dimensional trajectory data, to obtain a vehicle and a mobile phone signaling user corresponding to the vehicle;
   S5: extracting a passing time of the vehicle passing through a road section in the license plate recognition data, calculating time differences between the passing time and travel trajectory points of the mobile phone signaling user corresponding to the vehicle, and taking start and end locations of a travel of mobile phone signaling data in which a minimum time difference is located as OD of a current travel of the vehicle,
   wherein the matching the mobile phone signaling data trajectories against the license plate recognition data trajectories specifically comprises steps of:
   S41: searching all sequences of the mobile phone signaling data trajectories and the license plate recognition data trajectories for a longest common subsequences, and measuring a similarity degree between two trajectories by using trajectory expansion: determining whether a trajectory point in the mobile phone signaling data trajectories matches a trajectory point in the license plate recognition data through vertical matching of the fifth threshold by using a longest common subsequence (LCS) algorithm, that is, calculating a Euclidean distance between the two trajectory points, and determining whether the distance is less than the fifth threshold;
   S42: sorting the license plate recognition data according to the passing time, and performing following steps on each trajectory point in a trajectory of the license plate recognition data from top to bottom:
   S421: for a first trajectory point in license plate data, calculating difference values between a passing time of the trajectory point and a base station entry time of each trajectory point in the mobile phone signaling data, and if the difference value is less than a time threshold, labeling the part of trajectory points of the mobile phone signaling data as time matching trajectory points;
   S422: for the time matching trajectory points, calculating Euclidean distances between these mobile phone signaling trajectory points and trajectory points in the license plate recognition data, and writing 1 in a matching quantity field following a mobile phone signaling user ID corresponding to a mobile phone signaling trajectory point with a distance between two points being less than the fifth threshold;
   S423: for mobile phone signaling data in which no character string has been written in the matching quantity field, calculating any two adjacent trajectory points of the mobile phone signaling data, calculating a foot of a trajectory point on a line segment formed by the two points, if the foot is on the line segment, determining whether the foot satisfies the time threshold and the fifth threshold, and if yes, automatically writing 1 in a matching quantity field following a mobile phone signaling user ID corresponding to the mobile phone signaling trajectory point;
   S424: repeatedly performing steps S421 to S423 on each trajectory point in the license plate recognition data, and if there is already a quantity during automatically writing in the matching quantity field, automatically adding 1 to the quantity; and
   S425: after the foregoing steps have been completed on all trajectory points of license plate recognition data of one license plate, selecting a signaling user with the largest quantity in the matching quantity field of the mobile phone signaling data as the mobile phone signaling user corresponding to the vehicle, and
   wherein a missing trip information in the license plate recognition data is remedied by using the mobile phone signaling data, and a missing data of the license plate recognition data for the OD locations is filled, accurate and a real-time traffic data is provided to improve a traffic efficiency of urban expressways and mitigate and alleviate deteriorating traffic conditions and traffic congestion.

2. The method for extracting OD locations of a vehicle on an expressway according to claim 1, wherein the mobile phone signaling data comprises a user ID, a base station sequence number, a base station entry time, a base station exit time, base station longitude data, and base station latitude data; and the license plate recognition data comprises recognition device data and detection data, the recognition device data comprises a video bayonet sequence number, video bayonet name, video bayonet longitude, and video bayonet latitude, and the detection data comprises a license plate number and a passing time.

3. The method for extracting OD locations of a vehicle on an expressway according to claim 1, wherein the preprocessing the mobile phone signaling data comprises steps of:
   deleting repetitive mobile phone signaling data;
   eliminating drift data in the mobile phone signaling data: if distances between a data point and two adjacent points in a trajectory of the mobile phone signaling user are both greater than the first threshold and a distance between a location of one of the adjacent points and a location of the other adjacent point is less than twice the first threshold, determining the data point as a drift data point, and eliminating the drift data point;
   eliminating ping-pong data in the mobile phone signaling data: for a trajectory of the mobile phone signaling user, if in any adjacent time trajectory points, a speed between any adjacent trajectory points is greater than the second threshold, eliminating intermediate trajectory points, and keeping an initial point and an end point, to obtain actual mobile phone signaling data trajectories.

4. The method for extracting OD locations of a vehicle on an expressway according to claim 1, wherein the preprocessing the license plate recognition data comprises steps of:
   for redundant repetitive license plate recognition data, only keeping a first piece of license plate recognition data;
   deleting license plate recognition data with a license plate number, a video bayonet sequence number or a passing time missing; and
   deleting abnormal license plate recognition data with a license plate number field not satisfying a license plate number arrangement rule.

5. The method for extracting OD locations of a vehicle on an expressway according to claim 1, wherein the preprocessing the license plate recognition data further comprises: matching a passing time field format of the license plate recognition data into a base station entry and exit time format of mobile phone signaling data in minutes, and converting longitude and latitude fields in the license plate recognition data into longitude and latitude of a Globe Positioning System (GPS) navigation system in the mobile phone signaling data.

6. The method for extracting OD locations of a vehicle on an expressway according to claim 1, wherein the segmenting the mobile phone signaling data trajectories comprises the following steps:

S31: arranging the mobile phone signaling data in ascending order with a user ID as a primary keyword and a base station entry time as a secondary keyword, and generating a travel chain of each signaling user on one day;

S32: for each signaling user, if a speed v between any two time-adjacent trajectory points in any k time-adjacent trajectory points is less than the third threshold and a time for which the signaling user has stayed at k time-adjacent trajectory points is greater than the fourth threshold, recognizing all the k time-adjacent trajectory points as stay points;

S33: with the stay points as trajectory segmentation points, labeling travel orders of any consecutive non-stay points as a same number starting from a first piece of mobile phone signaling data that is not recognized as a stay point, and labeling travel orders of any consecutive non-stay points following an encountered stay point as an incremented number of the previous number, to progressively arrange the mobile phone signaling data; and S34: deleting stay points in the mobile phone signaling data, and keeping data after a travel order is recognized through trajectory segmentation, wherein a calculation formula of the speed v between two time-adjacent trajectory points in step S32 is as follows:

$$v_{i+1} = \frac{d(\text{point}_i, \text{point}_{i+1})}{\text{point}_i^{in} \cdot t - \text{point}_{i+1}^{in} \cdot t}, \quad (1)$$

wherein d represents a distance function between two points, and $\text{point}_i^{in} \cdot t$ represents a base station entry time of the $\text{point}_i$.

7. The method for extracting OD locations of a vehicle on an expressway according to claim 1, further comprising recognizing a travel mode of the mobile phone signaling data before matching the mobile phone signaling data trajectories against the license plate recognition data trajectories, comprising steps of:

determining an optimal clustering parameter K by using an elbow method, wherein a calculation formula is as follows:

$$SSE = \sum_{i=1}^{K} \sum_{p \in C_i} |p - m_i|^2, \quad (2)$$

wherein in the formula: K is the clustering parameter; $C_i$ is an $i^{th}$ cluster; p is a sample point $C_i$; and $m_i$ is a centroid of $C_i$; and after the data in the area is divided into travel orders and categorization is performed according to whether there is a record in a subway station, determining a cluster number respectively by using the elbow method, inputting the foregoing clustering indicators into a K-means++ algorithm to perform clustering, to obtain a clustering result of the K-means++ algorithm with no record in a subway station and a clustering result of the K-means++ algorithm with a record in a subway station, and recognizing travel modes of a non-motor vehicle travel and rail transport without transfer to another transport mode; and eliminating signaling users of travels that only comprise rail transport and have no transfer to another transport mode and non-motor vehicle travels, to reduce a calculation amount in a trajectory matching process.

8. The method for extracting OD locations of a vehicle on an expressway according to claim 1, wherein reliability of a matching result is verified by using a path similarity degree, specifically comprising steps of:

a similarity degree of an LCS is $S_{LCS}(P_{j,R}, P_{j',R'}) = D_{LCS}(P_{j,R}, P_{j',R'})/\min\{R, R'\}$, wherein $D_{LCS}(P_{j,R}, P_{j',R'})$ represents a length of a longest common subsequence between two trajectories, and $\min\{R, R'\}$ represents a length of a sequence with a short length between the trajectory $P_{j,R}$ and the trajectory $P_{j',R'}$, with a value ranging from 0 to 1; and according to a definition, when the value of $S_{LCS}(P_{j,R}, P_{j',R'})$ is closer to 1, it represents that the two trajectories are more similar.

\* \* \* \* \*